Patented Apr. 30, 1940

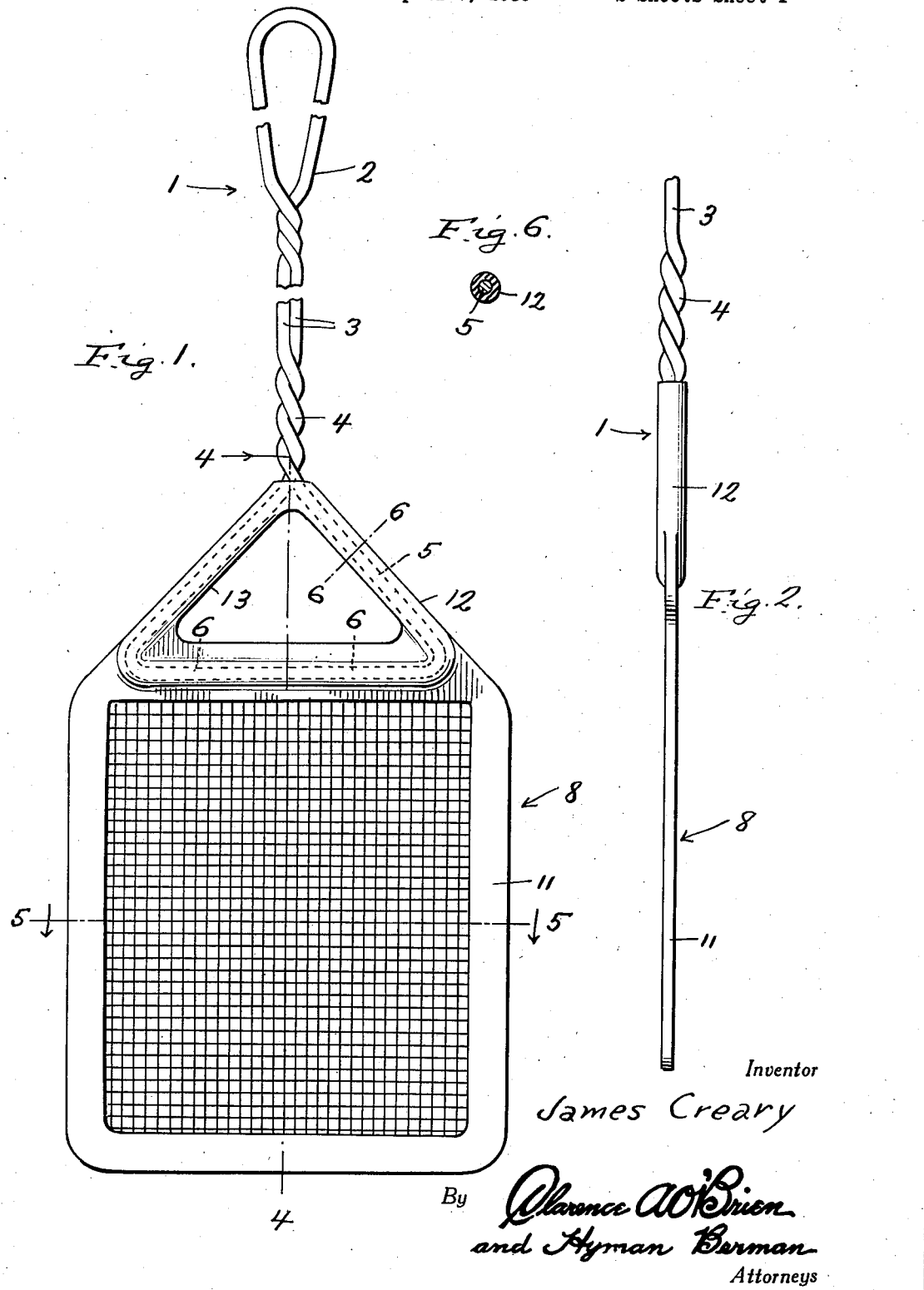

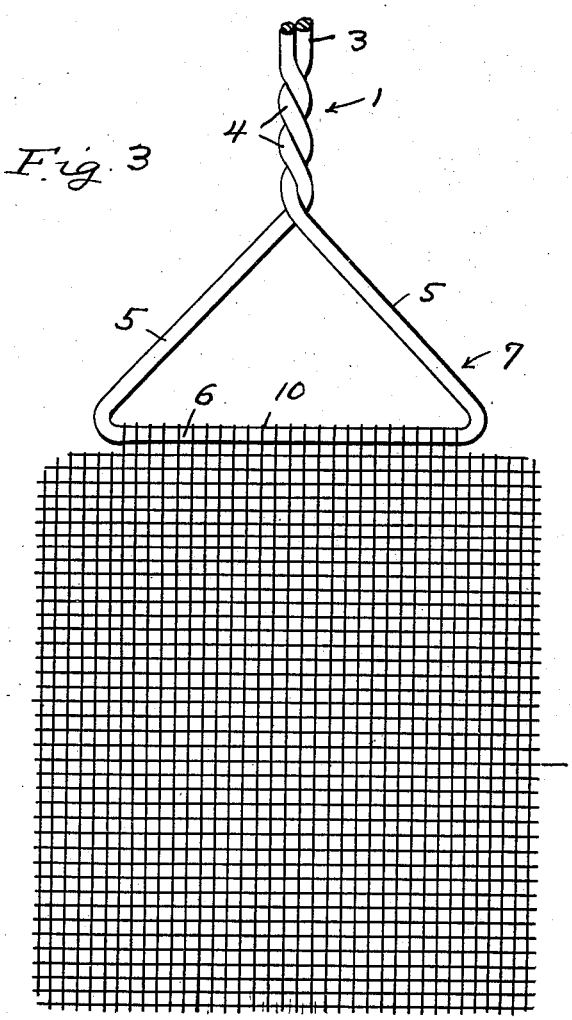
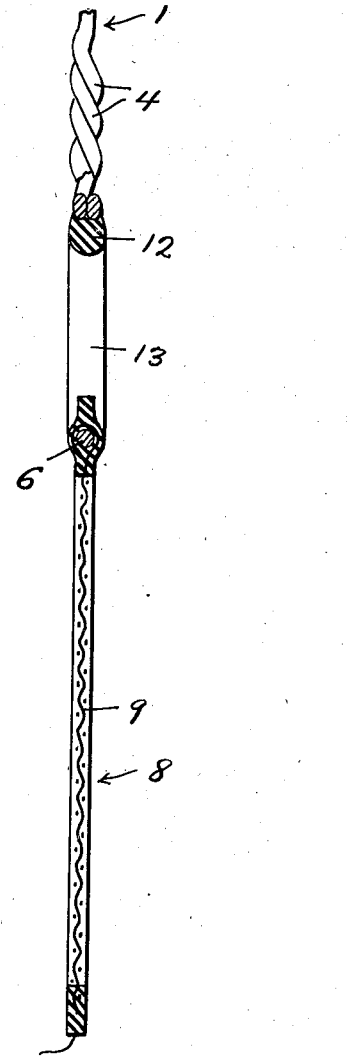

2,199,044

UNITED STATES PATENT OFFICE 2,199,044

FLY SWATTER

James Creary, De Funiak Springs, Fla.

Application April 7, 1939, Serial No. 266,579

1 Claim. (Cl. 43—137)

The present invention relates to new and useful improvements in fly swatters and has for one of its important objects to provide, in a manner as hereinafter set forth, a device of this character embodying a novel construction and arrangement whereby the blade of the instrument will be hingedly connected to the handle thereof.

Another very important object of the invention is to provide a fly swatter of the character described comprising a blade of such construction that the life of the device will be materially increased.

Other objects of the invention are to provide a fly swatter of the aforementioned character which will be comparatively simple in construction, highly efficient and reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a plan view of a fly swatter constructed in accordance with the present invention.

Figure 2 is a view in side elevation of the lower portion of the device.

Figure 3 is a plan view, illustrating the method of hingedly connecting the reticulated member to the handle.

Figure 4 is a vertical sectional view, taken substantially on the line 4—4 of Fig. 1.

Figure 5 is a cross sectional view, substantially on the line 5—5 of Fig. 1.

Figure 6 is a detail view in cross section, taken substantially on the line 6—6 of Fig. 1.

Referring now to the drawings in detail, it will be seen that the embodiment of the invention which has been illustrated comprises a handle which is designated generally by the reference numeral 1. The handle 1 is formed from a single length of any suitable wire which is bent upon itself or twisted at an intermediate point and formed to provide an elongated loop constituting a grip 2. The wire extends forwardly from the grip 2 in the form of parallel legs 3 the forward portions of which are twisted together, as at 4. From the twisted portions 4, the legs 3 diverge, as at 5, and terminate in inturned free end portions 6, thus providing a substantially triangular loop which is designated generally by the reference numeral 7.

Mounted on the forward end of the handle 1 is a blade which is designated generally by the reference numeral 8. The blade 8 comprises a wire mesh sheet 9 of suitable dimensions. As best seen in Figs. 3 and 4 of the drawings, the reticulated sheet 9 includes an integral extension on one of its marginal edges which is bent or looped, as at 10, around the portions 6 of the handle 1 in a manner to hingedly mount said sheet thereon.

The blade 8 further includes a molded frame 11 of resilient rubber having strip like portions in which the marginal portions of the reticulated sheet 9 are imbedded. This is best seen in Figs. 4 and 5 of the drawings. The resilient frame 11 includes a substantially triangular extension 12 on one end which encloses the correspondingly shaped loop 7 of the handle 1, together with the hinge connection 10. Thus, the connection between the reticulated sheet 9 and the handle 1 is materially strengthened. The extension 12 has formed therein a substantially triangular opening 13.

The device is used in the usual manner by grasping the grip 2 of the handle 1 and swinging the blade 8. The resilient rubber frame 11 permits flexing and swinging of the blade on the handle when the instrument is in use but causes said blade to always return immediately to its normally flat shape. The resilient rubber frame 11, enclosing the marginal portions of the reticulated sheet 9, also prevents damaging furniture and walls when struck with the instrument.

It is believed that the many advantages of a fly swatter constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A fly swatter of the class described comprising a handle having a triangularly shaped loop at one end thereof, a part of which forms a transversely extending bar at said end of the handle, a sheet of wire mesh of greater width than the length of the bar and having a reduced portion at one edge thereof which has its ends spaced from the side edges of the sheet, said reduced part being looped over the bar to hingedly connect the sheet with the handle and a resilient frame having strip-like portions extending around the edges of the sheet and in which said edges are embedded and said frame having a substantially triangularly shaped portion at one end in which is embedded the triangular loop of the handle, the triangular part of the frame having a triangular opening therein which is enclosed by the loop of the handle.

JAMES CREARY.